US010710429B2

(12) United States Patent
MacNeille et al.

(10) Patent No.: US 10,710,429 B2
(45) Date of Patent: Jul. 14, 2020

(54) VEHICLE CABIN ODOR DETECTION AND AMELIORATION

(71) Applicant: Ford Global Technologies, LLC, Dearborn, MI (US)

(72) Inventors: Perry Robinson MacNeille, Lathrup Village, MI (US); Victoria Leigh Schein, Dearborn, MI (US); Clay Wesley Maranville, Ypsilanti, MI (US); Kerrie Kathleen Gath, Pittsfield, MI (US); Jeffrey Brian Yeung, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 15/685,945

(22) Filed: Aug. 24, 2017

(65) Prior Publication Data

US 2019/0061466 A1    Feb. 28, 2019

(51) Int. Cl.
| | |
|---|---|
| *B60H 1/00* | (2006.01) |
| *F24F 11/30* | (2018.01) |
| *B60H 3/00* | (2006.01) |
| *B60H 3/06* | (2006.01) |
| *F24F 110/50* | (2018.01) |
| *F24F 110/60* | (2018.01) |

(52) U.S. Cl.
CPC ......... *B60H 1/00735* (2013.01); *B60H 1/008* (2013.01); *B60H 1/00821* (2013.01); *B60H 1/00985* (2013.01); *B60H 3/0035* (2013.01); *B60H 3/06* (2013.01); *F24F 11/30* (2018.01); *F24F 2110/50* (2018.01); *F24F 2110/60* (2018.01)

(58) Field of Classification Search
CPC ..... B60H 3/0085; B60H 1/00735; F24F 11/30
USPC ........................................... 454/156
See application file for complete search history.

(56) References Cited

U.S. PATENT DOCUMENTS

| | | | | |
|---|---|---|---|---|
| 3,815,405 | A * | 6/1974 | Dravnieks ............ | G01N 30/463 73/23.34 |
| 5,385,028 | A * | 1/1995 | Gavlak ................ | B60H 1/3207 62/133 |
| 7,013,656 | B2 * | 3/2006 | Yanagimachi ..... | B60H 1/00742 165/202 |

(Continued)

FOREIGN PATENT DOCUMENTS

| | | |
|---|---|---|
| WO | WO 0222075 A2 | 3/2002 |
| WO | WO 2017046146 A1 | 3/2017 |

*Primary Examiner* — Edelmira Bosques
*Assistant Examiner* — Dana K Tighe
(74) *Attorney, Agent, or Firm* — Frank Lollo; Eversheds Sutherland (US) LLP (57) ABSTRACT

Method and apparatus are disclosed for vehicle cabin odor detection and amelioration. An example vehicle includes an array of chemical sensors, a spectrograph, and an environmental control system. The example environmental control system generates a spectrum, with the spectrograph, of chemical components of volatilomes in air inside a cabin and classifies the volatilomes based on the spectrum, measurements from the array of chemical sensors, and occupant preferences. Additionally, the environmental control system, when the volatilomes are indicative of an offensive scent, applies a mitigation strategy to affect the composition of the air in the cabin.

11 Claims, 4 Drawing Sheets

(56) References Cited

U.S. PATENT DOCUMENTS

| | | | |
|---|---|---|---|
| 8,083,575 B2 * | 12/2011 | Kim | B60H 1/008 |
| | | | 297/180.11 |
| 8,145,383 B2 | 3/2012 | Prokhorov | |
| 8,986,998 B2 | 3/2015 | Lee et al. | |
| 9,176,104 B2 | 11/2015 | Haddad et al. | |
| 2004/0141875 A1 * | 7/2004 | Doshi | A61L 9/20 |
| | | | 422/4 |
| 2005/0191213 A1 * | 9/2005 | Casillas | G01N 1/22 |
| | | | 73/864.34 |
| 2007/0103680 A1 * | 5/2007 | De Vandiere | G01J 3/02 |
| | | | 356/301 |
| 2008/0188172 A1 | 8/2008 | Hollemans et al. | |
| 2009/0242656 A1 * | 10/2009 | Peard | A61L 9/03 |
| | | | 239/8 |
| 2010/0144261 A1 * | 6/2010 | Barkic | B60H 1/00457 |
| | | | 454/75 |
| 2011/0172931 A1 * | 7/2011 | Murthy | G16C 20/20 |
| | | | 702/32 |
| 2016/0361452 A1 * | 12/2016 | Blackley | A24F 47/008 |

* cited by examiner

VEHICLE CABIN ODOR DETECTION AND AMELIORATION

TECHNICAL FIELD

The present disclosure generally relates to heating, ventilation, and air conditioning systems in a vehicle and, more specifically, vehicle cabin odor detection and amelioration.

BACKGROUND

As vehicles are used, various odors can be present in a vehicle. These odors can be pleasant. However, often these odor are unpleasant. For example, odors may be from spoiled meat, sweaty clothes, or various body odors. Traditionally, occupants have very few options to deal with the odors.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle cabin odor detection and amelioration. An example vehicle includes an array of chemical sensors, a spectrograph, and an environmental control system. The example environmental control system generates a spectrum, with the spectrograph, of chemical components of volatilomes in air inside a cabin and classifies the volatilomes based on the spectrum, measurements from the array of chemical sensors, and occupant preferences. Additionally, the environmental control system, when the volatilomes are indicative of an offensive scent, applies a mitigation strategy to affect the composition of the air in the cabin.

An example method includes measuring properties of air inside a cabin with an array of chemical sensors installed in a vehicle and generating a spectrum, with a spectrograph installed in the vehicle, that identifies chemical components of volatilomes in the air. The method also includes classifying the volatilomes based on the spectrum, measurements from the array of chemical sensors, and occupant preferences. Additionally, the method includes, when the volatilomes are classified as indicative of an offensive scent, applying a mitigation strategy to an environmental control system of the vehicle to affect the composition of the air in the cabin.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, smells that a person considers pleasant are referred to as fragrances and smells that a person considers to be unpleasant or offensive are referred to as odors. Odor management in a cabin of a vehicle can improve a user experience. Some odors are pleasant, some odors are neutral, and some odors are offensive. Odor manager involves classifying odors in the vehicle cabin to select a proper mitigation technique. This is different from detecting hazardous materials in the air where sensors tend to be very specific, such as a carbon monoxide sensor, a carbon dioxide sensor, a humidity sensor, and particulate sensors, etc. Classifying odors in a vehicle cabin involves understanding preferences of occupants of the vehicle. An odor consists of different concentrations of several chemicals. A single chemical may smell good in combination with one set of chemicals and bad in another set of chemicals. So odors need to be considered as overlapping sets of airborne substances in defined concentration ranges (sometime referred to as "volatilomes").

As disclosed below, a vehicle includes an array of chemical sensors and a spectrometer (sometime referred to herein as a "spectrograph"). The spectrometer produce spectrums that represent the chemicals in the air. These spectrums are responsive to changes in atmospheric concentrations of volatile compounds and are used to identify volatilomes in the dynamically changing atmosphere of the vehicle cabin. Because people react to different smells differently, smell classification takes into account preferences of the occupants of the vehicle. An smell classification and mitigation system uses machine learning algorithms (such as neural networks, classification trees, etc.) to classify the volatilomes as pleasant, neutral, or offensive based on the preferences of occupants of the vehicle. When the smell is offensive, the smell classification and mitigation system controls the heating, ventilation, and air conditioning system (HVAC) and other vehicle systems to attempt to ameliorate the odor. For example, the system may control duct gates, blowers, injectors, a chiller, a heater, filters, and/or windows. In some examples, because the volatilomes change chemically with time or because an occupant's sensitivity to a volatilome may change over time, the system prioritizes some volatilomes over others in its mitigation strategy.

Figure 1:
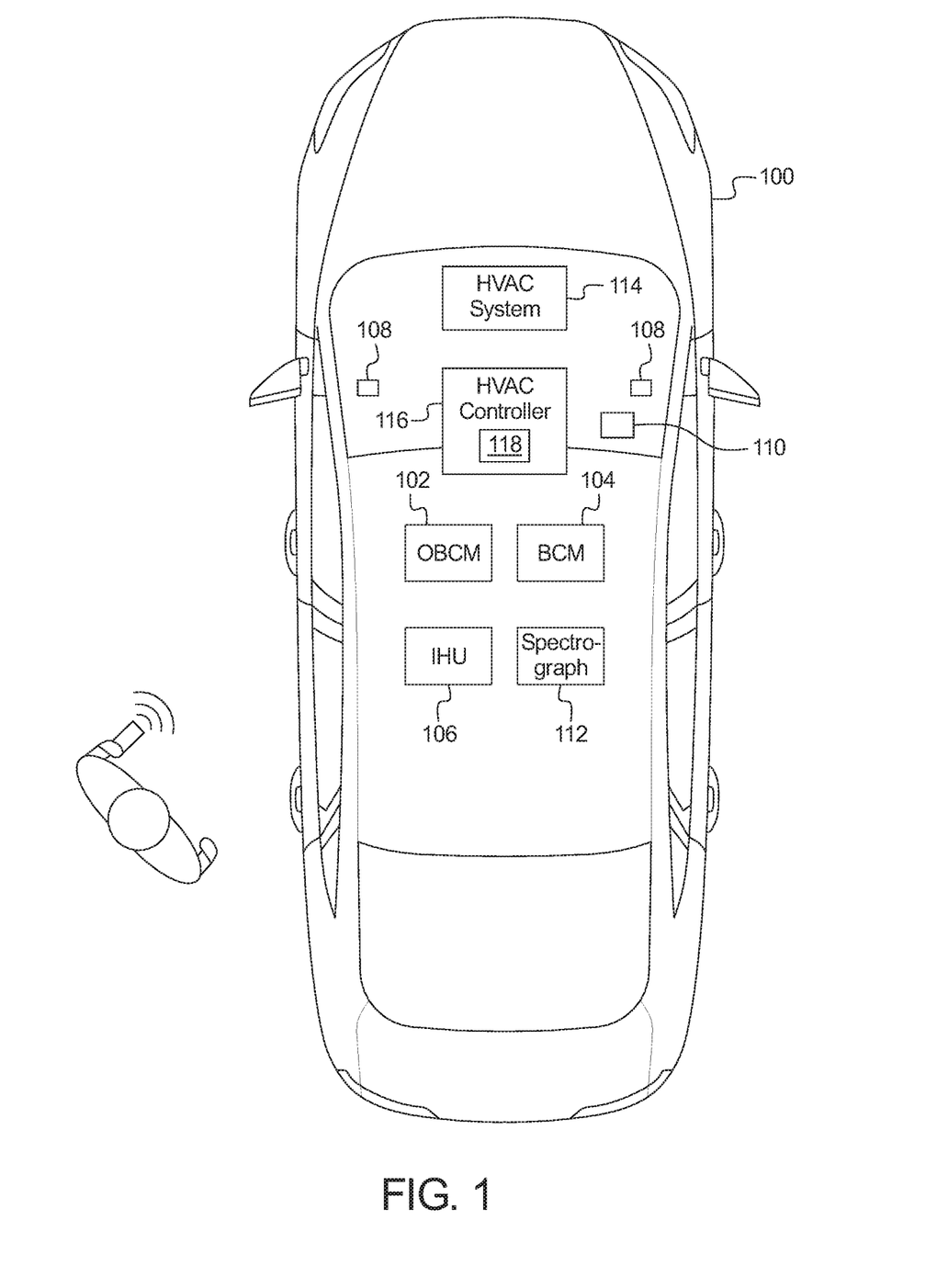
FIG. 1 illustrates a vehicle operating in accordance with the teachings of this disclosure.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a power train with an engine, a transmission, a suspension, a driveshaft, and/or wheels, etc.

The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes an on-board communications module (OBCM) 102, a body control module (BCM) 104, an infotainment head unit (IHU) 106, a cabin air intake 108, an array of chemical sensors 110, a spectrograph 112, an HVAC system 114, and an HVAC controller 116. The combination of the HVAC controller 116 and the HVAC system 114 is sometime referred to as an "environmental control system."

The on-board communications module 102 communicates with other vehicles, environmental servers, and/or mobile devices (e.g., phones, watches, tablet computers, etc.) to received communication regarding occupant preferences and/or environmental factors that affect the volatilomes in the cabin of the vehicle 100. For example, when the information from the other vehicle and/or the environmental server indicate the presence of one the volatilomes, the vehicle 100 (e.g., via the HVAC controller 116) may not open windows or vents in order to mitigate the volatilomes in the cabin. The on-board communications module 102 includes wired or wireless network interfaces to enable communication with external networks. The on-board communications module 102 also includes hardware (e.g., processors, memory, storage, antenna, etc.) and software to control the wired or wireless network interfaces. In the illustrated example, the on-board communications module 102 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications module 102 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the vehicle 100 may communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The body control module 104 controls various subsystems of the vehicle 100. For example, the body control module 104 may control power windows, power locks, an immobilizer system, and/or power mirrors, etc. The body control module 104 includes or is communicatively coupled to circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc.

The infotainment head unit 106 provides an interface to inform occupants about the volatilomes detected in the cabin and facilitate occupants of the vehicle to expressing their reaction to the detected volatilomes. The infotainment head unit 106 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 106 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 106 displays the infotainment system on, for example, the center console display.

The cabin air intake 108 includes a pump to provide samples of the air in the cabin to the array of chemical sensors 110 and the spectrograph 112. In some examples, the cabin air intake 108 is position behind the dashboard with a vent located proximate to or integrated with the infotainment head unit 106.

The array of chemical sensors 110 is set of heterogeneous sensors that produce a set of values based on properties of the input air. Each sensors in the array of chemical sensors 110 detects a single chemical compound in the intake air. In some examples, the chemical sensors are chemical resistant films (sometimes referred to as "polymer thin film chemical sensors") that have functional surfaces that change their conductivity when exposed to an analyte vapors (e.g., alcohols, esters, alkanes, and hydrocarbon aromatics, etc.) present in the intake air. For example, one chemical sensor may react to pentyl butyrate and another chemical sensor may react to octenol.

The spectrograph 112 generates a spectrum based on the chemical composition of the volatilomes present in the intake air. The spectrograph 112 is tunable (e.g., the spectrograph can be tuned, via a control signal, to provide greater sensitivity or selectivity) to produces a time series of spectra based on properties of the input air. The tuning provides greater sensitivity or selectivity by narrowing the range of chemicals to be detected and classified. The spectra produced by the spectrograph 112 provides the existence and concentration of components of the volatilomes that are not limited to a specific set of values.

The HVAC system 114 includes heaters, blowers, duct gates, vents, injectors, chillers, and filters that control the temperature, quality, and routing of the air circulating in the cabin of the vehicle. The heater and chiller maintain a temperature of the air at a set point determined by the HVAC controller 116. The blower controls the strength at which the air is expelled from the vents. The ducts gates control the routing of air to the different vents and through different filters.

The HVAC controller 116 controls the components of the HVAC system 114 according to its settings. These settings may be received from an occupants via the infotainment head unit 106 and/or a mobile device communicatively coupled to the on-board communications module 102. Additionally, the HVAC controller 116 may, from time to time, instruct the body control module 104 to open, partially open, close, or partially close one or more of the windows of the vehicle. In the illustrated example, the HVAC controller 116 includes a scent analyzer 118. As disclosed in connection with FIG. 2 below, the scent analyzer 118 (a) detects the volatilomes, (b) learns how occupants identify and perceive the volatilomes based on occupant preferences and/or feedback, and (c) controls the HVAC system 114 and/or the windows to mitigate the volatilomes that are considered offensive. In some examples, the scent analyzer 118 verbalizes scent information via the infotainment head unit 106.

Figure 2:
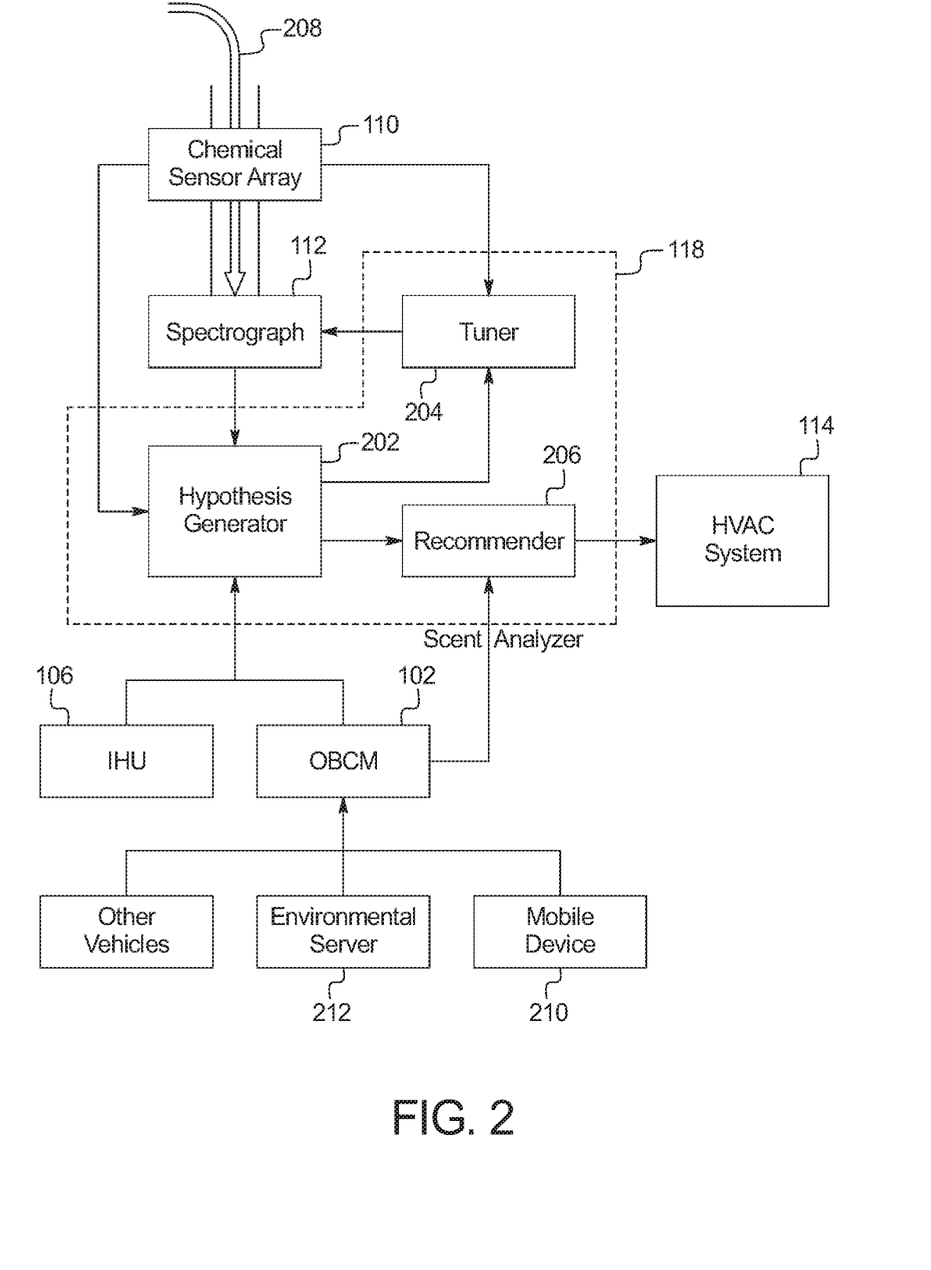
FIG. 2. is a block diagram a scent analyzer of an heating, ventilation, and air conditioning system of the vehicle of FIG. 1.

FIG. 2 is a block diagram of the scent analyzer 118 of FIG. 1. In the illustrated example, the scent analyzer 118 includes a hypothesis generator 202, a tuner 204, and a recommender 206. The hypothesis generator 202 receives spectra from the spectrograph 112 that includes data representative of the presence and concentration of chemicals in the stream of cabin air 208. The hypothesis generator 202 produces a time series of data value sets based on the spectra. The hypothesis generator 202 then creates an n-best list of scents (volatilome sets) based on the previous hypothesis, the most recent time series of data value set, information from the array of chemical sensors 110, user preferences (e.g., from the mobile devices 210 in the vehicle 100 and/or the infotainment head unit 106), environmental date (e.g., weather, geographic-based scents, etc.) from the environmental server 212, scent information from other vehicles, and/or the thermodynamic state of the input air, etc.

The tuner 204 generates a control signal for the spectrograph 112 to provide greater sensitivity or selectivity for potential chemicals associated with the volatilomes in the intake air. The control signal is based on the chemicals identified by the array of chemical sensors 110 and the n-best list of scents generated by the hypothesis generator 202. The control signal may, for example, adjust resolution offset values to adjust the intensity and resolution of probable chemicals in the intake air.

The recommender 206 receives the n-best list of scents generated by the hypothesis generator 202. The recommender 206 associates each scent within the n-best list of scents with a unique identifier. In some examples, the recommender 206 also associated the scents with natural language identifiers (e.g., "mold," "pineapple," "roses," etc.) by interrogating a database of scents (e.g., via the on-board communications module 102). In some examples, the natural language identifiers are communicated to the occupants via the infotainment head unit 106. Additionally, in some examples, the recommender solicits feedback from the occupants (e.g., via the infotainment head unit 106 and/or the mobile device(s) 210 of the occupant(s), etc.) of whether the scent is pleasant, neutral, or offensive and/or giving the scent a rating (e.g., from 0 to 10, etc.). The recommender 206 classifies the scents as either pleasant, neutral, or offensive. The classifications are based on machine learning (e.g., neutral networks, one-armed bandit, etc.) using the chemicals that compose the scent and the feedback by the occupants. In such a manner, the recommender 206 attempts to classify scents that scent analyzer 118 has not analyzed before.

Based on the classification and preferences of the occupants of the vehicle 100, the recommender 206 instructs the components of the HVAC system 114 to act to mitigate the scent. For example, the recommender 206 may instruct the duct gates to pass the air through a different filter or instruct the body control module 104 to open one of the windows. In some example, the recommender 206 (a) adjusts the setting of the blower, (b) adjusts the temperature, (c) opens one or more windows, (d) injects a fragrance into the cabin of the vehicle 100, (e) adjusts the vents through which the air is blown, and/or (e) changes filters through which the air is passed, etc. The recommended actions are sensitive to environmental and/or weather factors. For example, if the offensive scent originates from outside the vehicle 100 or if the weather is bad (e.g., rainy, snowy, cold, etc.), the recommender 206 may exclude mitigation strategies that cause outside air from entering the cabin.

Figure 3:
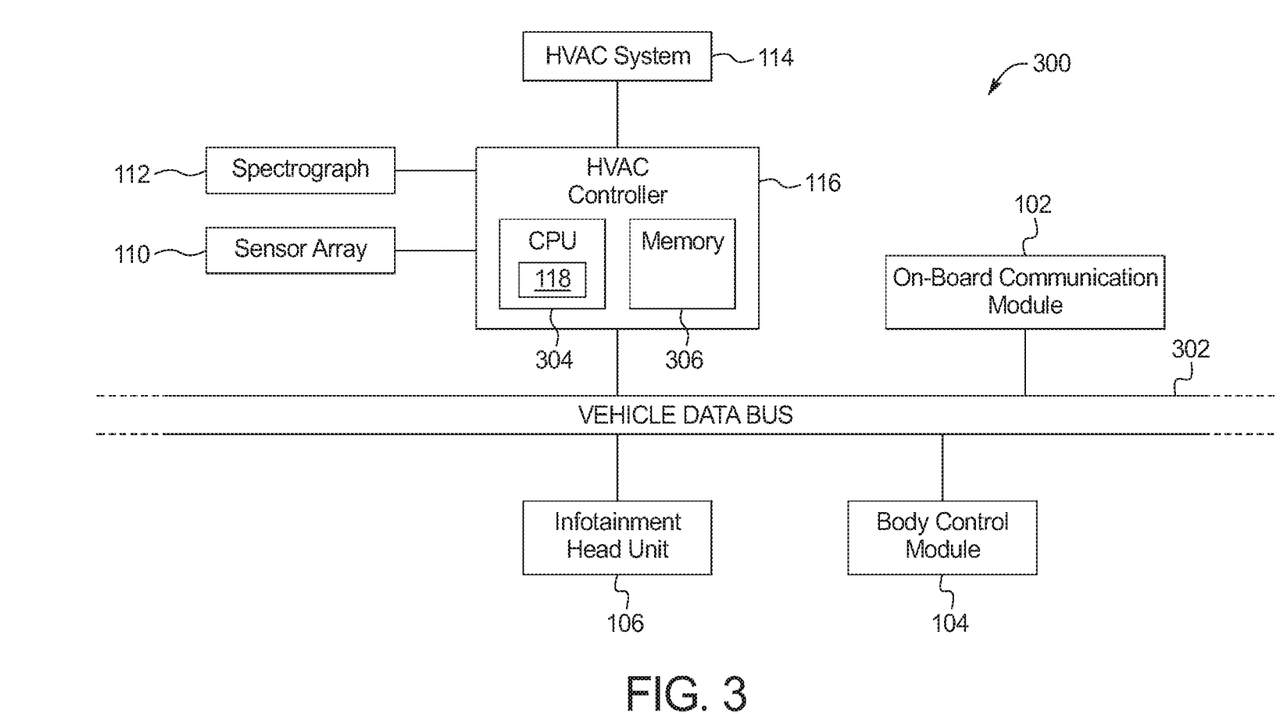
FIG. 3 is a block diagram of electronic components of the vehicle of FIG. 1.

FIG. 3 is a block diagram of electronic components 300 of the vehicle 100 of FIG. 1. In the illustrated example, the electronic components 300 include the on-board communications module 102, the body control module 104, the infotainment head unit 106, the cabin air intake 108, the array of chemical sensors 110, the spectrograph 112, the HVAC system 114, the HVAC controller 116, and a vehicle data bus 302.

In the illustrated example, the HVAC controller 116 includes a processor or controller 304 and memory 306. In the illustrated example, the HVAC controller 116 is structured to include scent analyzer 118. The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 306 includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 302 communicatively couples the on-board communications module 102, the body control module 104, the infotainment head unit 106, and the HVAC controller 116. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
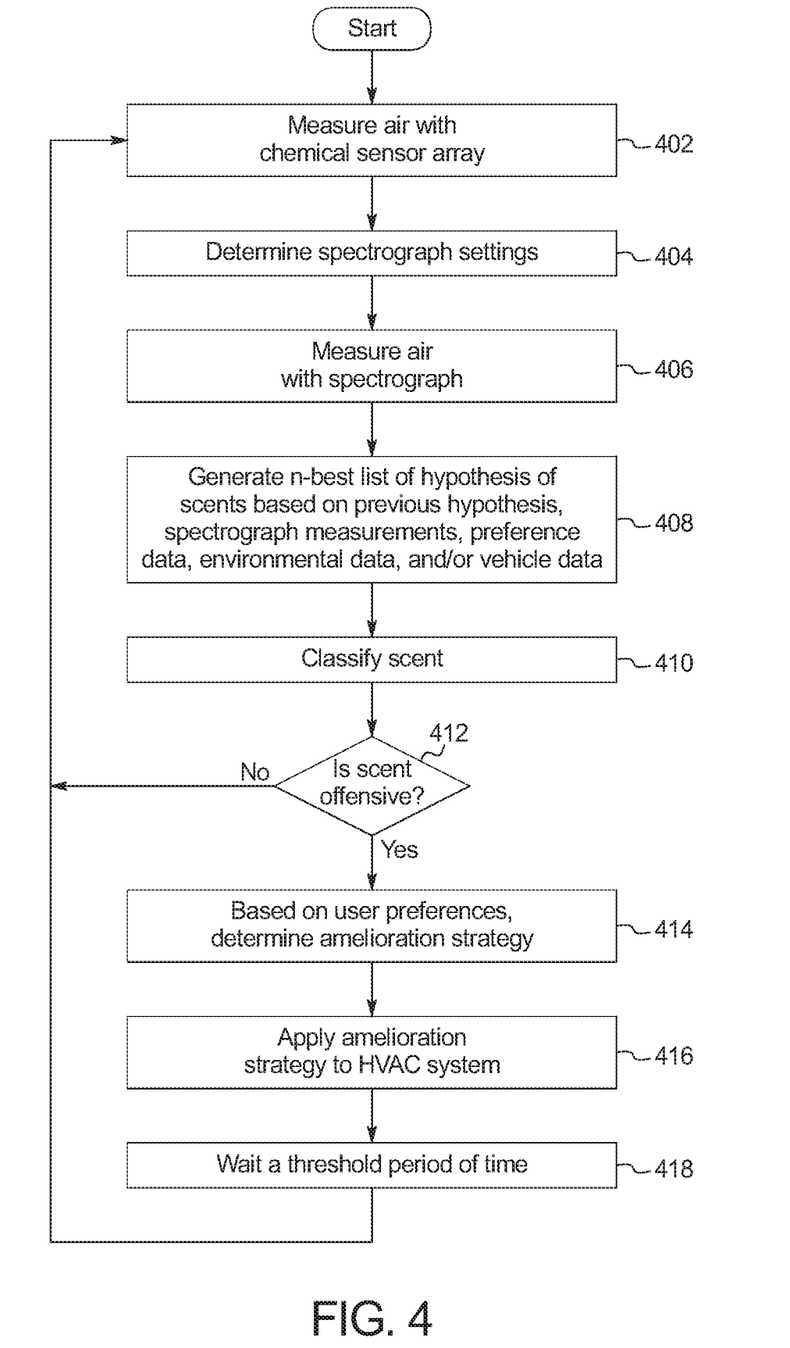
FIG. 4 is a flowchart of a method to classify and ameliorate odors in the cabin of the vehicle of FIG. 1, which may be implemented by the electronic components of FIG. 3.

FIG. 4 is a flowchart of a method to classify and ameliorate offensive volatilomes (sometime referred as "odors") in the cabin of the vehicle 100 of FIG. 1, which may be implemented by the electronic components 300 of FIG. 3. Initially, at block 402, the array of chemical sensors 110 reacts to the chemicals in the volatilomes in the intake air. At block 404, the scent analyzer 118 determines the control signal for the spectrograph 112. At block 406, the spectrograph 112 measures the chemicals in the volatilomes in the intake air. At block 408, the scent analyzer generates an n-best list of hypothesis of scents in the intake air based on a previous hypothesis, the spectra produced by the spectrograph 112, the environmental data, and/or the preferences of the occupants, etc. At block 410, the scent analyzer 118 classifies the scent based on a model generated with machine learning (e.g., neutral networks, one-armed bandit, etc.) using the chemicals that compose the scent and the feedback by the occupants.

At block 412, the scent analyzer 118 determines whether the scent is offensive. When the scent is offensive, the method continues to block 414. Otherwise, when the scent is not offensive, the method returns to block 402. At block 414, the scent analyzer 118 selects a mitigation strategy based on user preferences. At block 416, the scent analyzer applies settings to the HVAC system 114 based on the selected mitigation strategy. At block 418, the scent analyzer 118 waits a threshold period of time (e.g., 10 seconds, 20 seconds, 30 seconds, etc.) to allow the mitigation strategy to start to affect the volatilomes in the air of the cabin of the vehicle 100.

The flowchart of FIG. 4 is representative of machine readable instructions stored in memory (such as the memory 306 of FIG. 3) that comprise one or more programs that, when executed by a processor (such as the processor 304 of FIG. 3), cause the vehicle 100 to implement the example scent analyzer 118 of FIGS. 1 and 2. Further, although the example program(s) is/are described with reference to the flowchart illustrated in FIG. 4, many other methods of implementing the example scent analyzer 118 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a chemical sensor;
a spectrograph; and
an environmental control system configured to:
generate a spectrum, with the spectrograph, of chemical components of a volatilome in air inside a cabin of the vehicle;
provide an identifier of the volatilome to an occupant of the vehicle;
receive feedback regarding the provided identifier of the volatilome;
classify the volatilome based on the spectrum, measurements from the chemical sensor, and the feedback regarding the provided identifier of the volatilome; and
apply, based on the classification, a mitigation strategy to affect a composition of the air in the cabin of the vehicle.

2. The vehicle of claim 1, including a cabin air intake to pass the air through the chemical sensor and the spectrograph.

3. The vehicle of claim 1, wherein the identifier of the volatilome is indicative of a scent and wherein the identifier of the voltilome is a natural language identifier.

4. The vehicle of claim 1, wherein the feedback regarding the provided identifier of the volatilome comprises an indication of an enjoyment of a scent associated with the volatilome.

5. The vehicle of claim 1, wherein the mitigation strategy includes at least one of opening a window, changing a temperature of the air, switching a source of the air, injecting a fragrance into the air, and passing the air through a filter.

6. The vehicle of claim 1, wherein the environmental control system is further configured to generate a control signal based on a hypothesis of a scent associated with the volatilome and the measurement from the chemical sensor.

7. A method comprising:
measuring a property of air inside a vehicle cabin with a chemical sensor installed in a vehicle;
generating a spectrum, with a spectrograph installed in the vehicle, that identifies chemical components of a volatilome in the air inside the vehicle cabin;
providing an identifier of the volatilome to an occupant of the vehicle;
receiving feedback regarding the provided identifier of the volatilome;
classifying the volatilome based on the spectrum, measurements from the chemical sensor, and the feedback regarding the provided identifier of the volatilome; and
applying, based on the classification, a mitigation strategy to an environmental control system of the vehicle to affect a composition of the air in the cabin of the vehicle.

8. The method of claim 7, including:
identifying the volatilome as being indicative of a scent and associate a nature language identifier with the volatilome; and
wherein classifying the volatilome includes classifying the volatilome into one of categories including pleasant, neutral, or offensive based preferences of occupants of the vehicle retrieved from a mobile device of the occupant of the vehicle.

9. The method of claim 7, wherein receiving feedback regarding the provided identifier of the volatilome comprises an indication of an enjoyment of a scent associated with the volatilome.

10. The method of claim 7, wherein the mitigation strategy includes at least one of opening a window, changing a temperature of the air, switching a source of the air, injecting a fragrance into the air, and passing the air through a filter.

11. The method of claim 7, further comprising generating a control signal to change an operation of the spectrograph based on a hypothesis of a scent associated with the volatilome and the measurement from the chemical sensor.

* * * * *